Feb. 7, 1956          E. I. VALYI          2,733,488

APPARATUS FOR PRODUCING SHELL MOLDS

Filed Oct. 24, 1952          9 Sheets-Sheet 1

Inventor
EMERY I. VALYI

Attorney

Feb. 7, 1956

E. I. VALYI 2,733,488

APPARATUS FOR PRODUCING SHELL MOLDS

Filed Oct. 24, 1952

Inventor
EMERY I. VALYI

By

Attorney

Feb. 7, 1956       E. I. VALYI       2,733,488
APPARATUS FOR PRODUCING SHELL MOLDS
Filed Oct. 24, 1952       9 Sheets-Sheet 4

Inventor
EMERY I. VALYI

By
Attorney

Feb. 7, 1956
E. I. VALYI
2,733,488
APPARATUS FOR PRODUCING SHELL MOLDS
Filed Oct. 24, 1952
9 Sheets-Sheet 6
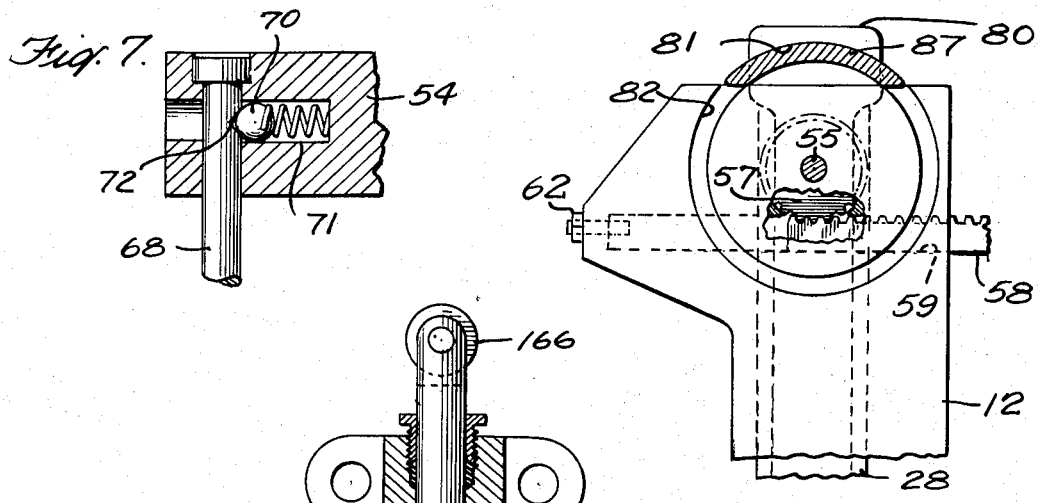
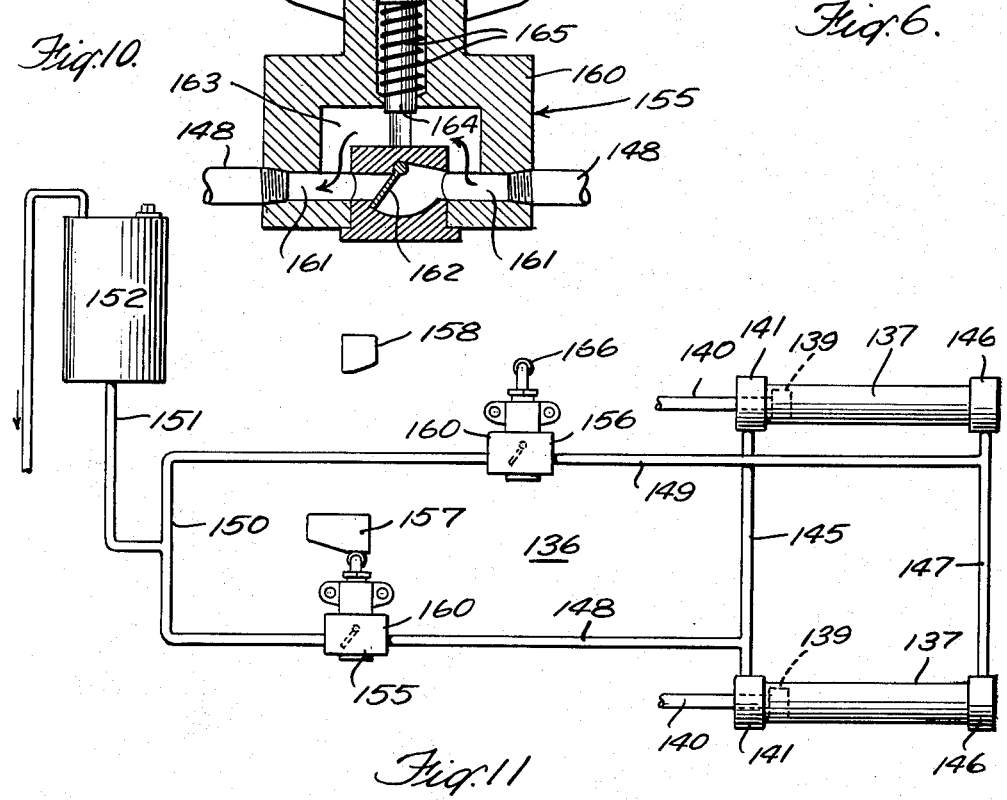
Inventor
EMERY I. VALYI
Attorney

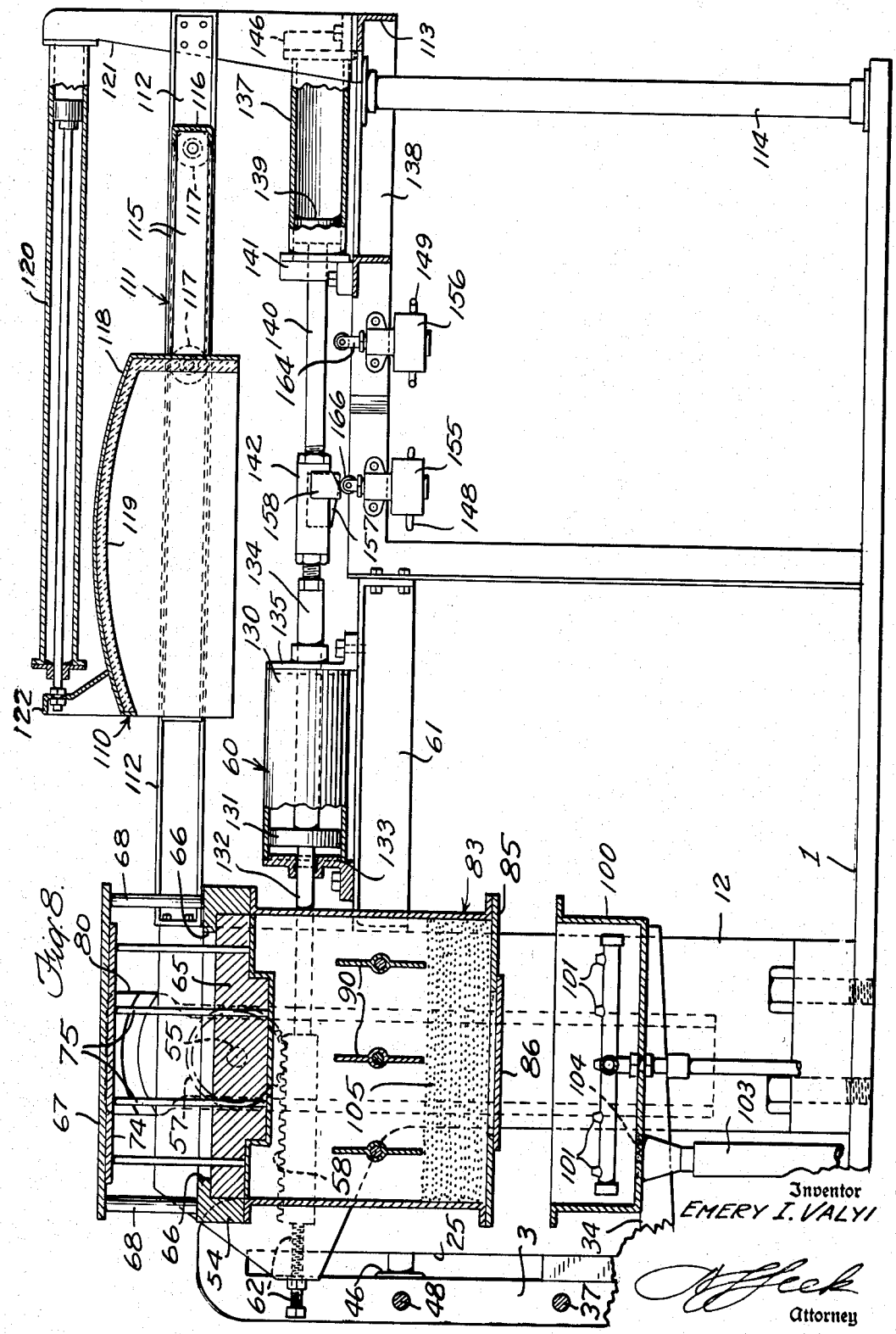

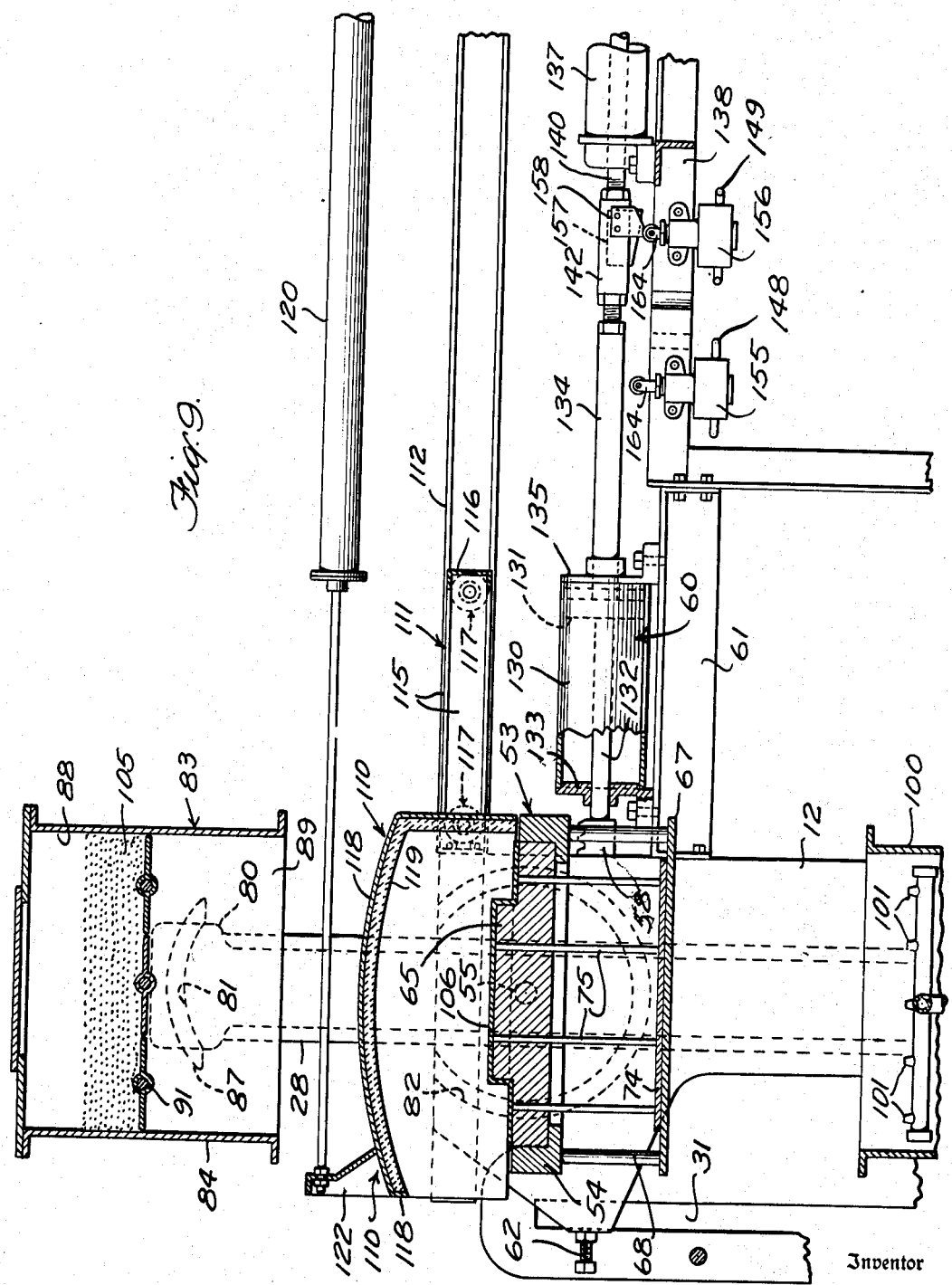

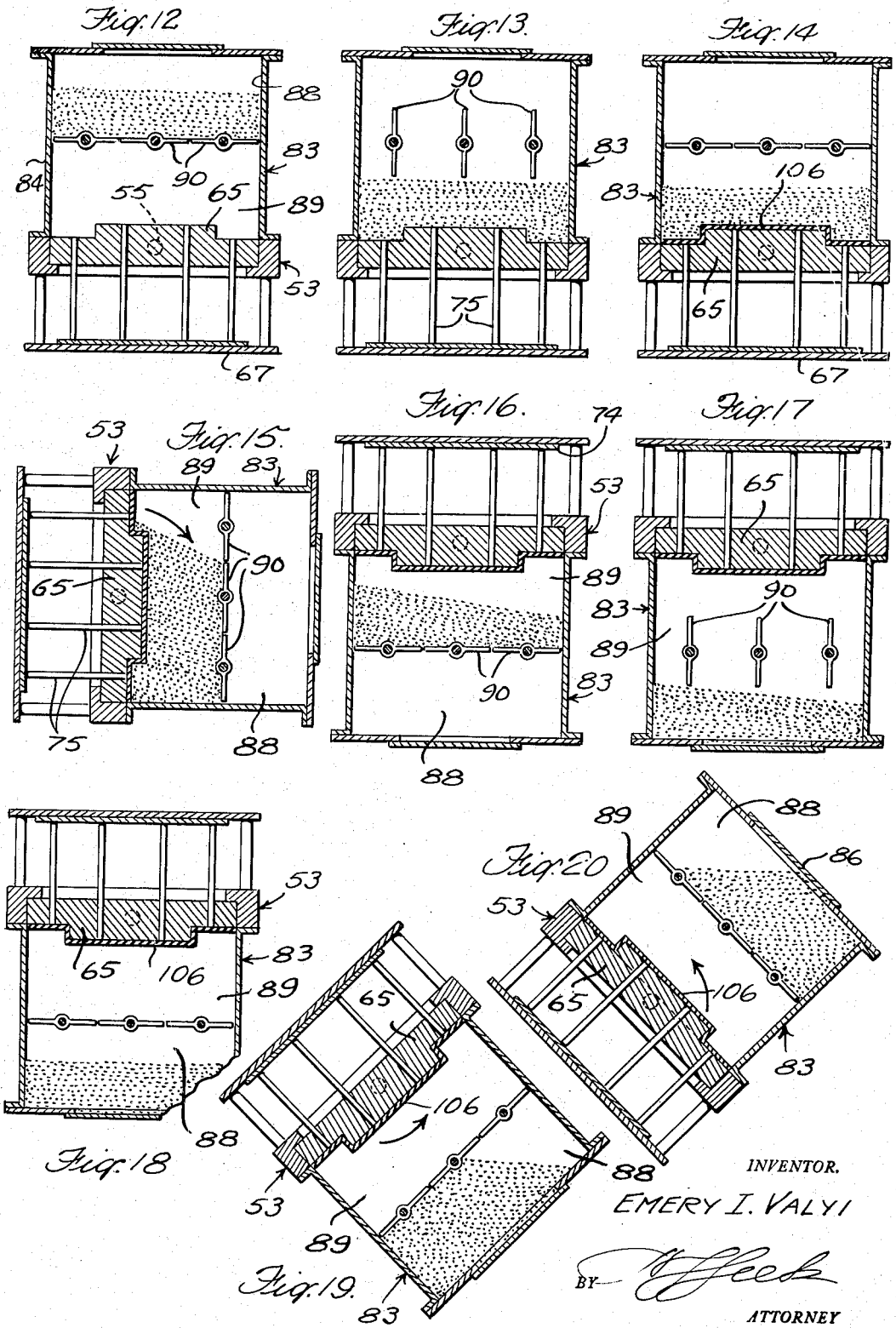

United States Patent Office 2,733,488
Patented Feb. 7, 1956

2,733,488

APPARATUS FOR PRODUCING SHELL MOLDS

Emery I. Valyi, New York, N. Y.

Application October 24, 1952, Serial No. 316,627

10 Claims. (Cl. 22—20)

This invention relates to apparatus for producing foundry molds in shell form from a molding mixture comprising a refractory and a bonding agent, and is an improvement of the Mold Forming Machines disclosed in my co-pending applications Serial No. 226,460, filed May 15, 1951, now Patent 2,659,945, issued November 24, 1953, and Serial No. 292,677, filed June 10, 1952, now Patent 2,659,944, issued November 24, 1953.

Machines of this type provide means for processing a permanent pattern in a plurality of steps for pretreating the pattern, forming the mold shell thereon, curing the shell and stripping the cured shell from the pattern.

More specifically the machines include a pattern carrier with ejector pins, mounted to rotate about a horizontal axis for inverting and restoring the carrier as required, a hopper carrying the molding mixture, a container for a mold release liquid, and a heating oven. Mechanism is provided for bringing the pattern carrier and hopper into juxtaposition for applying a layer of the molding mixture to the patterns, inverting the pattern carrier and hopper as a unit to dump the excess mixture back into the hopper after the mold shell has been formed, bringing the carrier and oven into cooperating position for curing the shell, actuating the ejector pins to strip the cured shell from the pattern, and bringing the carrier and container into juxtaposition for applying a mold release liquid to the pattern prior to the next mold-forming sequence.

In the embodiment shown the oven is mounted on a carriage to shift into and out of heating relation with the pattern carrier and a mold shell thereon. The hopper is adapted to be raised or lowered into or out of contact with the carrier and to rotate with the carrier. The container is mounted below the carrier and is adapted to be raised or lowered as required, and the ejector pins are mounted on an ejector plate to be engaged by the hopper or by the container, according to whether the carrier is upright or inverted for stripping the mold shell from the pattern.

The said hopper is shown as comprising a rectangular casing which is open at the lower end thereof and is adapted to be moved into and out of engagement with the pattern carrier around the periphery of the pattern. A set of louvers are mounted in the hopper between the upper and lower ends thereof and divide the hopper into two compartments. The louvers are opened and closed by suitable mechanism.

The container comprises a drain tank in which are mounted a plurality of spray nozzles. The drain tank is mounted to be raised and lowered and drains into a sump tank from which the release liquid is pumped under high pressure to the spray nozzles.

In operation the molding mixture is placed in the upper compartment above the louvers in the sand hopper. The hopper is then lowered into engagement with the top of the pattern carrier around the periphery of the pattern. The louvers are then opened to allow the molding mixture to drop down into the lower compartment upon the preheated pattern. After the mixture has bonded into a thin layer over the pattern, the pattern carrier and hopper are invered by rotating them in unison through 180°. As the carrier and hopper are inverted the unbonded molding mixture falls back into the upper compartment (now the bottom compartment), leaving the thin bonded shell on the pattern. The louvers are then closed and the hopper and holder are restored to upright position, after which the hopper is raised from the pattern carrier. The oven is then moved into position under the hopper and over and around the pattern carrier and the partially cured shell on the pattern. After the shell is cured into a hard, rigid, strong condition, the oven is returned to its original position out of heating relation with the pattern and shell.

The drain tank is then raised to engage and elevate the ejector plate which caused the ejector pins to strip the cured shell mold upwardly from the pattern after which the shell can be removed from the machine. If it is desired to strip the shell downwardly from the pattern, the pattern holder is inverted and the hopper is moved downwardly to engage and depress the ejector plate.

After the shell has been stripped from the pattern, the oven is moved back into position under the hopper and over and around the pattern carrier and pattern, for preheating of the pattern. After the pattern has been heated to the desired temperature the oven is returned to its original position and the pattern carrier and pattern are inverted. The drain tank is then raised into engagement with the pattern carrier around the periphery of the pattern and the pump actuated to force the release liquid or parting solution through the spray nozzles in the drain tank to thoroughly spray the parting solution over the face of the pattern. The excess parting solution is filtered and drains back into the sump tank. The drain tank is then lowered and the carrier and pattern returned to upright position. The operation just described is then repeated for each shell mold.

When using metal patterns the refractory bonding agent mixture may comprise silica, alumina or zirconia sands or flours for the refractory, and phenol; melamine or urea formaldehyde resins or other organic or inorganic bonding agents. With this mixture the pattern may be preheated to a temperature of from 350° F. to 600° F. The pattern may be contacted with the molding mixture to a depth of several inches for from five to twenty seconds during which time the heated pattern causes the mixture contacting the pattern to bond and solidify into a layer. A partly cured shell having a uniform thickness between one-eighth and one-quarter inch is then formed over the pattern. The thickness of the shell depends on the time of contact and the temperature of the pattern. The curing oven may have a temperature between 500° F. and 900° F. The pattern and shell are subjected to curing temperatures until the shell is cured into a hard, rigid and strong condition.

In order to produce a shell mold of uniform thickness and density from a molding mixture, such as described, it is essential that the molding mixture be evenly distributed over the heated pattern while it is in contact therewith. The depth of the molding mixture over the pattern is an important factor in producing saisfactory shell molds. If this depth varies over different sections of the pattern the resultant shell mold will vary accordingly.

As the holder and hopper are moved back and forth between upright and inverted positions the upper surface of the molding mixture in the hopper will be disposed at an angle to the supporting means therefor in both upright and inverted positions. When in upright position the molding mixture is supported above the pattern on the louvers which divide the hopper into upper and lower compartments, and are in closed position when the hopper is returned from inverted to upright position. In inverted position of the hopper the molding mixture rests on the closed end of the hopper. When the holder and hopper are in upright position with the molding mixture in the upper compartment of the hopper it is essential that the upper surface of the molding mixture be substantially parallel to the supporting louvers in order to provide a uniform depth to the molding mixture throughout the contained body thereof. Otherwise when the louvers are opened to drop the molding mixture onto the pattern the molding mixture will be deposited unevenly over the pattern which will result in a poor mold shell.

When the hopper is returned from inverted to upright position the depth of the molding mixture at the trailing end of the hopper is considerably greater than the depth thereof at the forward end of the hopper. Means are therefore provided to distribute the molding mixture to a uniform depth as the hopper comes to rest in upright position. This means comprises a braking mechanism which is incorporated in the holder and hopper rotating mechanism and is operative to abruptly decelerate the rotation of the holder and hopper as they approach the limit of their movement to upright position. This abrupt deceleration of the hopper throws the excess molding mixture at the trailing end of the hopper toward the forward end of the hopper thereby evenly distributing it throughout the upper compartment. If desired this braking mechanism may also be arranged to gradually decelerate the rotation of the holder and hopper as they approach the limit of their movement to inverted position in order to eliminate jarring and bumping.

The principal object of the invention is to provide an improved single station machine for producing shell molds from a molding mixture of the character described.

Another object of the invention is to produce a machine of this type which is of simple construction, is efficient in operation, and is relatively inexpensive to manufacture.

Other and more limited objects of the invention will be apparent from the following specification and the accompanying drawings forming a part thereof wherein:

Fig. 6 is a detail vertical section taken on the line 6—6 of Fig. 5;

Fig. 7 is a fragmentary detail section;

Fig. 8 is a longitudinal section taken on the line 8—8 of Fig. 5 showing the pattern holder and sand hopper inverted in order to return the unbonded molding mixture back to the upper compartment of the hopper and the oven in inoperative position;

Fig. 9 is a view similar to Fig. 8 showing the pattern holder and pattern in upright position with a mold shell formed on the pattern, the hopper raised up from the pattern holder and the oven in operative position over the pattern holder and pattern and under the hopper.

Fig. 10 is a vertical section through one of the two similar control valves used in the braking mechanism;

Fig. 11 is a diagrammatic layout of the piping of the braking mechanism; and

Figure 1:
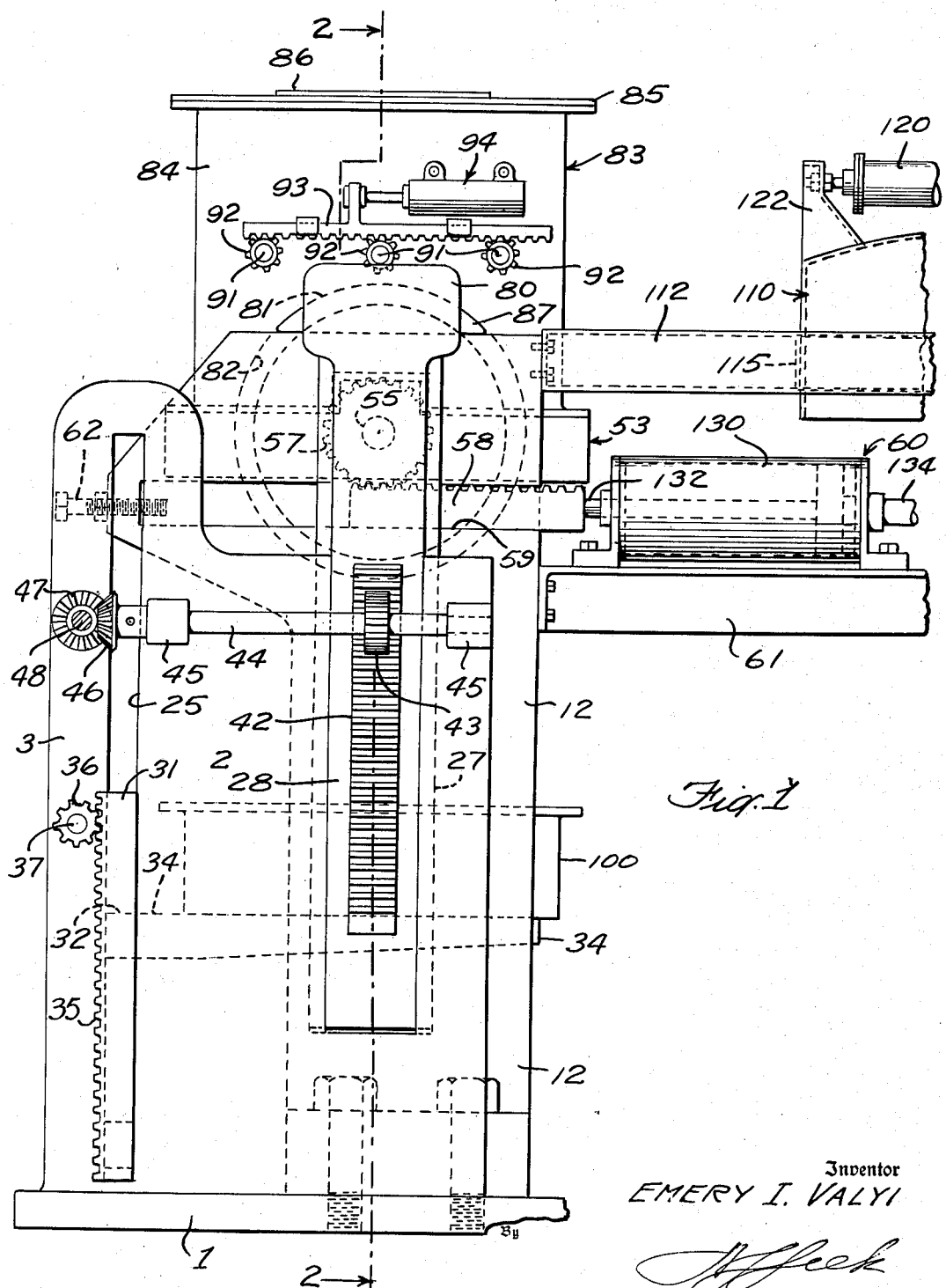
Fig. 1 is a fragmentary side elevation of an apparatus for producing shell molds, which is constructed according to my invention.

Figs. 12 to 20 inclusive are diagrammatic views illustrating the flow of the molding mixture in the hopper as the pattern holder and hopper are rotated back and forth in unison between upright and inverted positions.

Referring now to the drawings by reference characters, the numeral 1 indicates a flat rectangular base having spaced parallel similar side frames 2 and 3 extending upwardly from each side of the forward end thereof.

The side frames 2 and 3 are provided with opposed vertical transverse slots 25, adjacent the forward ends thereof, in which a cantilever frame, generally indicated by the numeral 26, is mounted for up and down movement. The side frames 2 and 3 are also provided with vertical T slots 27, formed in the outer faces thereof rearwardly of the slots 25, in which a pair of similar posts 28 are mounted for up and down movement.

The cantilever frame 26 comprises two spaced uprights 31, which are connected together by the transverse bars 32 and 33, and a pair of spaced parallel rearwardly extending horizontal arms 34 which are formed integral with the upper transverse bar 32. The uprights 31 are slidably mounted in the slots 25 and each upright 31 has a rack 35 secured thereto adjacent the outer faces of the side frames 2 and 3. The racks 35 mesh with pinion gears 36 which are keyed to a transverse shaft 37 rotatably supported by the side frames 2 and 3. The shaft 37 is driven in either direction by a reversible motor 38 through a suitable speed reducer 39. The rotation of the shaft 37 in one direction or the other will move the cantilever frame 26 up or down in the slots 25.

Each of the posts 28 has a rack 42 secured to the outer face thereof which meshes with a gear 43 keyed to a shaft 44 which is rotatably supported by brackets 45 extending outwardly from the side frames 2 and 3. The forward ends of the shafts 44 have bevel gears 46 keyed thereon which mesh with bevel gears 47 keyed to a transverse shaft 48 which is rotatably supported by the side frames 2 and 3 directly above the shaft 37. The shaft 48 is driven in either direction by a reversible motor 49 through a suitable speed reducer 50. The rotation of the shaft 48 in one direction or the other will move the posts 28 up or down in unison in the T slots 27.

A pattern carrier or pattern holder, generally indicated by the numeral 53, is rotatably mounted between the upper ends of a pair of spaced uprights 12 which are secured to the base 1 by bolts 11, adjacent the inner faces of the sides 2 and 3. The holder 53 comprises a rectangular frame 54 to which is secured a pair of oppositely extending axially aligned stub shafts 55. The stub shafts 55 are rotatably mounted in bearing apertures 56 in the uprights 12, and each shaft 55 has a pinion gear 57 keyed to the outer end thereof. Each of the gears 57 meshes with a rack 58 which is slidably mounted in a guide slot 59 in each of the uprights 12 below the gears 57. The racks 58 are reciprocated by air-actuated cylinder and piston assemblies 60 which are mounted upon brackets 61 secured to the rearward edges of the uprights 12. The forward movement of the racks 58 is limited by adjustable stops 62. The reciprocation of the racks 58 in unison between their forward and rearward positions will rotate the pattern holder 53 back and forth through 180° between upright and inverted positions.

A metal pattern 65 is removably secured by any suitable means in the pattern holder 53 and rests upon an inturned flange 66 around the lower edge of the frame 54.

Figure 3:
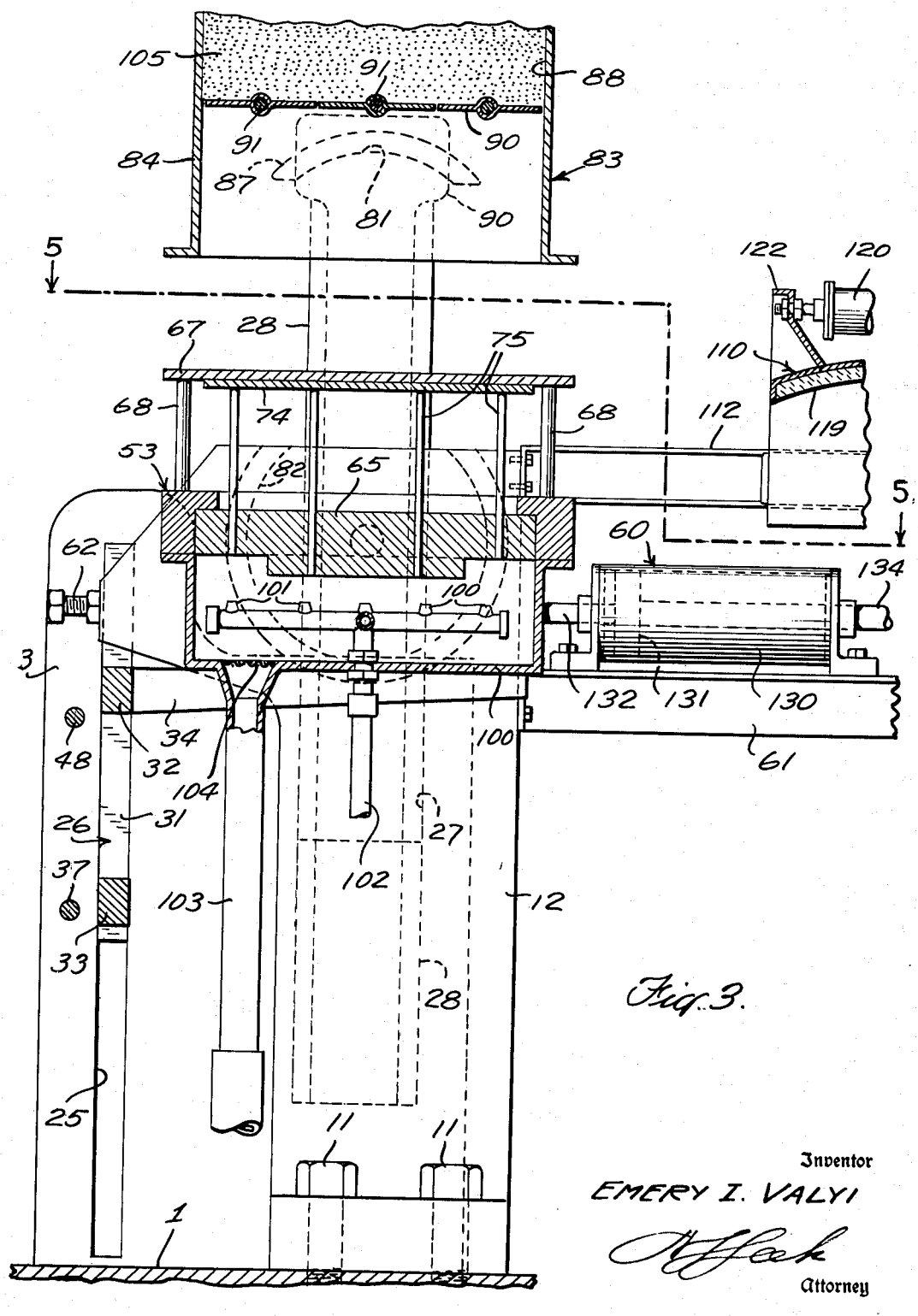
Fig. 3 is a central longitudinal vertical section taken on the line 3—3 of Fig. 2, showing the pattern holder in inverted position with the drain tank raised into engagement therewith preparatory to spraying the face of the pattern with parting solution.

An injector plate 67 is secured to the lower ends of rods 68 which are slidably mounted in the pattern holder frame 54 and extend downwardly from each corner thereof. The rods 68 are yieldingly held in their normal position when the pattern holder is inverted, as shown in Figs. 3 and 8, by spring-pressed balls 70 which are mounted in bores 71 in the pattern holder frame 54 and engage tapered notches 72 in the rods 68 (Fig. 7). A clamping plate 74 carrying a plurality of stripping pins 75 is removably secured to the ejector plate 67. The stripping pins 75 extend upwardly through bores in the pattern 65 and terminate flush with the face of the pattern.

Figure 4:
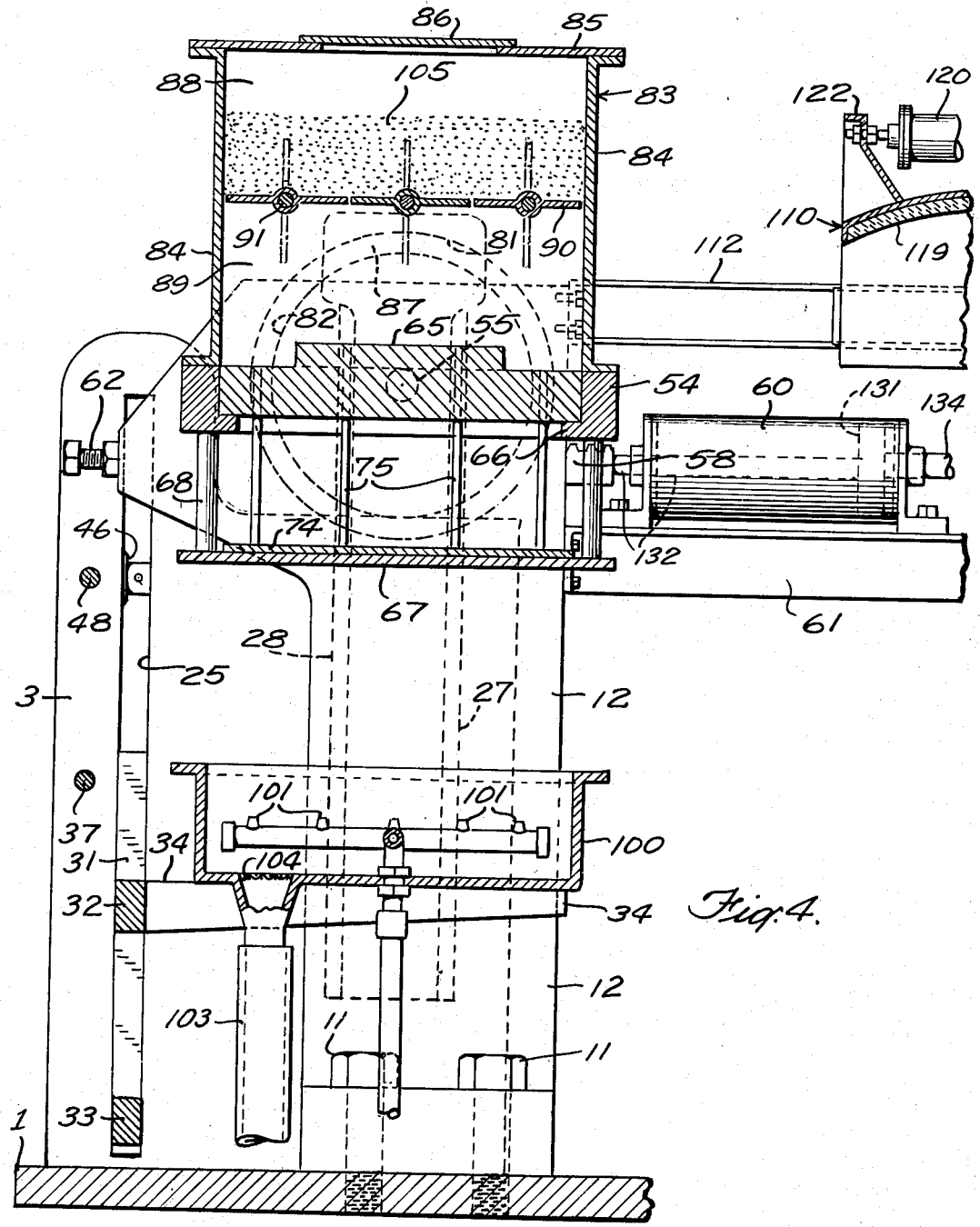
Fig. 4 is a view similar to Fig. 3 showing the sand hopper down in engagement with the pattern holder preparatory to opening the louvers to drop the molding mixture down upon the pattern.
Figure 5:
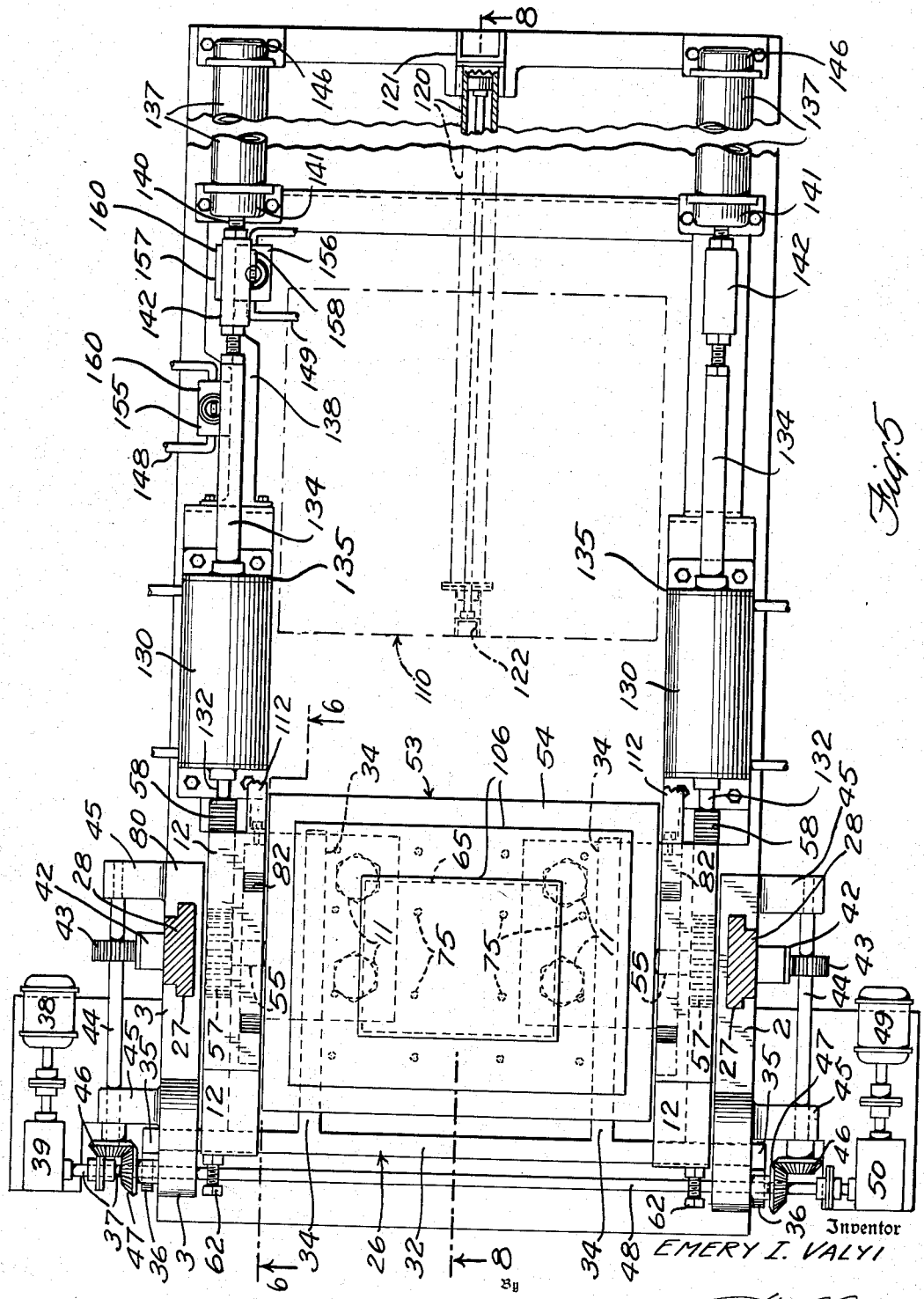
Fig. 5 is a sectional plan view, the plane of the section being indicated by the line 5—5 of Fig. 3.

The upper ends of the posts 28 are enlarged, as indicated at 80, and extend inwardly over the upper ends of the uprights 12. The opposed inner faces of the heads 80 of the posts 28 are disposed in the planes of the opposed inner surfaces of the uprights 12. The inner faces of the heads 80 have arcuate slots 81 formed therein which register with arcuate slots 82 in the inner surfaces of the uprights 12 when the posts 28 are in their lowermost position, as shown in Figs. 1, 4 and 6. The slots 81 and 82 when in register form a complete circle, the center of which is in the axis of the stub shafts 55.

A hopper 83 is mounted between the upper ends of the posts 28 for up and down movement therewith. The hopper 83 comprises a rectangular frame 84 the lower end of which is open and the upper end of which is closed by a plate 85 having a door 86 therein. The front and back walls of the frame 84 have arcuate segments 87 secured thereto which extend into the arcuate slots 81 in the heads 80 of the posts 28. The radii of curvature of the segments 87 are the same as the radii of the slots 81 and 82 so that the segments 87 may be rotated about the axis of the stub shafts 55 to move the segments out of the slots 81 in the post heads 80 and into the slots 82 in the uprights 12. The hopper 83 is normally disposed over the pattern holder 53 and is adapted to be brought down into engagement with the upper edge of the pattern holder frame 54 with the inner walls of the hopper registering with the inner walls of the frame 54. When the hopper 83 is in engagement with the pattern holder 53, it is adapted to be inverted in unison with the pattern holder. During inversion the segments 87 leave the slots 81 in the post heads 80 and enter the slots 82 in the uprights 12 which maintains the hopper against the pattern holder around the pattern. The hopper 83 is divided into upper and lower compartments 88 and 89 by a set of louvers 90 which are secured to shafts 91 rotatably supported by and between the front and back walls of the hopper. The ends of the shafts 91 have gears 92 secured thereto which mesh with racks 93 slidably mounted on the front and back walls of the hopper. The racks 93 are adapted to be reciprocated by air-actuated cylinder and piston assemblies 94 which are secured to the hopper walls above the racks 93. The reciprocation of the rack 93 will move the louvers 90 back and forth between their open and closed positions, as shown in Figs. 4 and 8.

The pattern treating mechanism by which the pattern is cleaned and a parting solution applied thereto comprises a drain tank 100 open at the upper end thereof which is mounted upon and removably secured to the arms 34 of the cantilever frame 26. A plurality of spray nozzles 101 are mounted in the tank 100. The parting solution is pumped under high pressure from a sump tank (not shown) to the spray nozzles 101 through a flexible hose 102. Excess solution drains back to the sump tank through a conduit 103 which is telescopically connected to the drain tank 100. A screen 104 is provided to keep any dirt or other foreign matter from draining into the sump tank with the excess parting solution.

A shell curing oven 110 is mounted upon a carriage 111 which is reciprocally mounted upon a pair of spaced parallel channel iron tracks 112. The forward ends of the tracks 112 are secured to the rear edges of the uprights 12, adjacent the upper ends thereof, and the rear ends thereof are tied together by a cross bar 113 and supported by posts 114 which extend up from the base 1. The carriage 111 comprises a pair of spaced parallel elongated side members 115 one of which is rigidly secured to each side of the oven 110. The members 115 extend rearwardly from the oven 110 a substantial distance and are tied together at the rear ends thereof by a cross bar 116. Each side member 115 carries a pair of spaced rollers 117 by which the carriage is reciprocally mounted between the channel iron tracks 112. The oven 110 comprises a sheet metal shell 118, open at the bottom and forward end thereof, which is lined with suitable refractory material 119. Suitable heating means (not shown) are mounted in or connected to the oven 110. The carriage 111 and oven 110 carried thereby are moved back and forth between operative and inoperative positions by a cylinder and piston assembly 120, one end of which is connected to a bracket 121 secured to and extending up from the cross bar 113, and the other end of which is connected to a bracket 122 carried by the oven 110.

The cylinder and piston assemblies 60 by which the racks 58 are reciprocated to rotate the pattern holder 53 and hopper 83 back and forth between upright and inverted positions each comprise a stationary cylinder 130 and a fluid actuated piston 131 reciprocally mounted therein. The pistons 131 which are preferably reciprocated by compressed air, which is alternately admitted to and exhausted from opposite ends of the cylinders 130 through suitable piping, are connected to the racks 58 by piston rods 132 which extend through suitable stuffing boxes in the forward ends 133 of the cylinder 130. Piston rods 134 are connected to the opposite sides of the pistons 131 and extend out through suitable stuffing boxes in the rear ends 135 of the cylinders 130.

Braking mechanism, generally indicated by the numeral 136, by which the movement of the pistons 131 is abruptly decelerated as the pistons 131 approach the rear ends 135 of the cylinders 130 in rotating the pattern holder 53 and hopper 83 from the inverted position shown in Fig. 8 to the upright position shown in Fig. 4, and by which the movement of the pistons 131 is gradually decelerated as the pistons 131 approach the forward ends 133 of the cylinders 130 in rotating the pattern holder 53 and hopper 83 from the upright position shown in Fig. 4 to the inverted position shown in Fig. 8 is provided. The abrupt or gradual deceleration of the movement of the pistons 131 will obviously impart a like deceleration to the rotation of the pattern holder 53 and hopper 83.

The braking mechanism 136 (see Fig. 1) comprises a pair of stationary cylinders 137 one of which is mounted on the supporting frame 138 in axial alignment with and spaced rearwardly from each of the cylinders 130. A piston 139, having a piston rod 140 connected thereto, is reciprocally mounted in each of the cylinders 137. The piston rods 140 extend out through the forward ends 141 of the cylinder 137 and are adjustably connected to the piston rods 134 by connector blocks 142 so that the piston 139 will be reciprocated in the cylinders 137 in unison with the reciprocation of the pistons 131 in the cylinder 130.

The forward ends 141 of the cylinders 137 are connected together by a conduit 145 and the rear ends 146 thereof are connected together by a conduit 147 (see Fig. 11). A conduit 148 is connected to the conduit 145 and extends forwardly therefrom, and a conduit 149 is connected to and extends forwardly from the conduit 147. The forward ends of the conduits 148 and 149 are connected together by a conduit 150 which in turn is connected by a conduit 151 to an elevated tank 152 containing hydraulic fluid, preferably oil. From this it will be seen that the cylinders 137 are always maintained full of oil on both sides of the pistons 139. A valve 155 is interposed in the conduit 148 and a similar valve 156 is interposed in the conduit 149. The valves 155 and 156 are mounted upon the frame 138, in spaced relation to each other, in position to be actuated by cams 157 and 158 secured to opposite sides of one of the connector blocks 142. The valve 155 is arranged to be actuated by the cam 157 as the pistons 131 and 139 approach the forward limit of their movement when rotating the pattern holder 53 and hopper 83 from the upright position shown in Fig. 4 to the inverted position shown in Fig. 8; and the valve 156 is arranged to be actuated by the cam 158 as the pistons 131 and 139 approach the limit of their movement toward the rear ends of the cylinders 130 and 137 when rotating the pattern holder 53 and hopper 83 from the inverted position shown in Fig. 8 to the upright position shown in Fig. 4.

The valve 155 will now be described, reference being had to Fig. 10. The valve 156 is identical with the valve 155, consequently the description of valve 155 will apply also to the valve 156. The valve 155 comprises a body 160 having a main passageway 161 therethrough in which is mounted a check valve 162 which is so disposed that fluid can only flow through the passageway 161 from left to right as viewed in Fig. 10. A bypass passageway 163 around the check valve 162 is provided within the body 160. The flow of fluid through the bypass 163 is controlled by a depressible plunger 164 which is adapted to be projected down into the bypass 163 to retard the flow of fluid therethrough. The farther the plunger 164 is projected into the bypass 163 the more the flow of fluid through the bypass 163 will be retarded, and the faster the plunger is depressed the faster the flow of fluid through the bypass will be retarded. A slow depressing of the plunger 164 will gradually check the flow of fluid through the bypass 163, whereas a fast quick depressing of the plunger 164 will abruptly check the flow of fluid through the bypass. When fluid is flowing from left to right through the valve 155, as viewed in Fig. 10, it can flow straight through the passageway 161, or through the bypass 163 or through both the passageway 161 and the bypass 163. But when fluid is flowing from right to left it can only flow through the bypass 163. The plunger 164 is normally held up out of the bypass 163 by a coiled spring 165. The upper end of the plunger 164 is provided with a roller 166 for engagement by the cams 157 or 158. The cam 157 is designed to slowly depress the plunger 164 and thereby gradually check the flow of fluid through the bypass 163 in the valve 155, and the cam 158 is designed to quickly depress the plunger 164 and thereby abruptly check the flow of fluid through the bypass 163 in the valve 156.

The operation of the braking mechanism 136 will now be described in connection with Figs. 10 and 11 of the drawings. When air under pressure is supplied to the rear ends of the cylinders 130 behind the piston 131 the pistons 131 will be forced forwardly in the cylinders 130 which through racks 58 and pinions 57 will rotate the pattern holder 53 and hopper 83 clockwise from upright to inverted position. The forward movement of the pistons 131 in the cylinders 130 will move the pistons 139 in the cylinders 137 forwardly in unison with the pistons 131 since the pistons 131 and 139 are rigidly connected together by the piston rods 134 and 140 and the connector blocks 142. As the pistons 139 are moved forwardly the fluid in front thereof will be forced out through the conduit 145 into the conduit 148 and through the bypass 163 in the valve 155 and from the valve 155 through the connecting conduit 150 to the valve 156. The fluid will flow freely through the passageway 161 in the valve 156 and through the conduits 149 and 147 into the rear ends of the cylinders 137 behind the pistons 139. The excess fluid needed to fill the cylinders 137 behind the piston 139 will be drawn from the tank 152 through the conduit 151. As the pistons 131 approach the limit of their forward movement the cam 157 will engage and slowly depress the plunger 164 in the valve 155 which will gradually check the flow of fluid out of the cylinders 137, ahead of the piston 139, and through the bypass 163 in the valve 155. The gradual checking of the flow of fluid out of the cylinders 137 will gradually decelerate the movement of the pistons 131 and the rotation of the pattern holder 53 and hopper 83 until they come to rest with the pattern holder and hopper in inverted position.

When air under pressure is supplied to the forward ends of the cylinders 130 in front of the piston 131 the pistons 131 will be forced rearwardly in the cylinders 130 which through the racks 58 and pinions 57 will rotate the pattern holder 53 and hopper 83 counterclockwise from inverted position to upright position. As the pistons 131 move rearwardly in the cylinders 130 they will move the pistons 139 in the cylinders 137 rearwardly in unison therewith. The rearward movement of the pistons 139 will force fluid from the rear ends of the cylinders 137 through the conduits 147 and 149 and through the bypass 163 in the valve 156. From the valve 156 the fluid will flow through the conduit 150 to the valve 155, and then freely through the passageway 161 in the valve 155 after which the fluid will flow through the conduits 148 and 145 into the forward ends of the cylinders 137 ahead of the pistons 139. The excess fluid forced from the rear ends of the cylinders 137 will flow through the conduit 151 into the tank 152. As the pistons 131 approach the limit of their rearward movement the cam 158 will engage and quickly depress the plunger 164 in the valve 156 which will abruptly check the flow of fluid out of the rear ends of the cylinders 137 and through the bypass 163 in the valve 156. The abrupt checking of the flow of fluid out of the cylinders 137 will abruptly decelerate the movement of the pistons 131, in the cylinders 130, and the rotation of the pattern holder 53 and hopper 83 after which they will continue to move at the decelerated rate to the limit of their movement when the pattern holder and hopper are in fully upright position.

Figure 2:
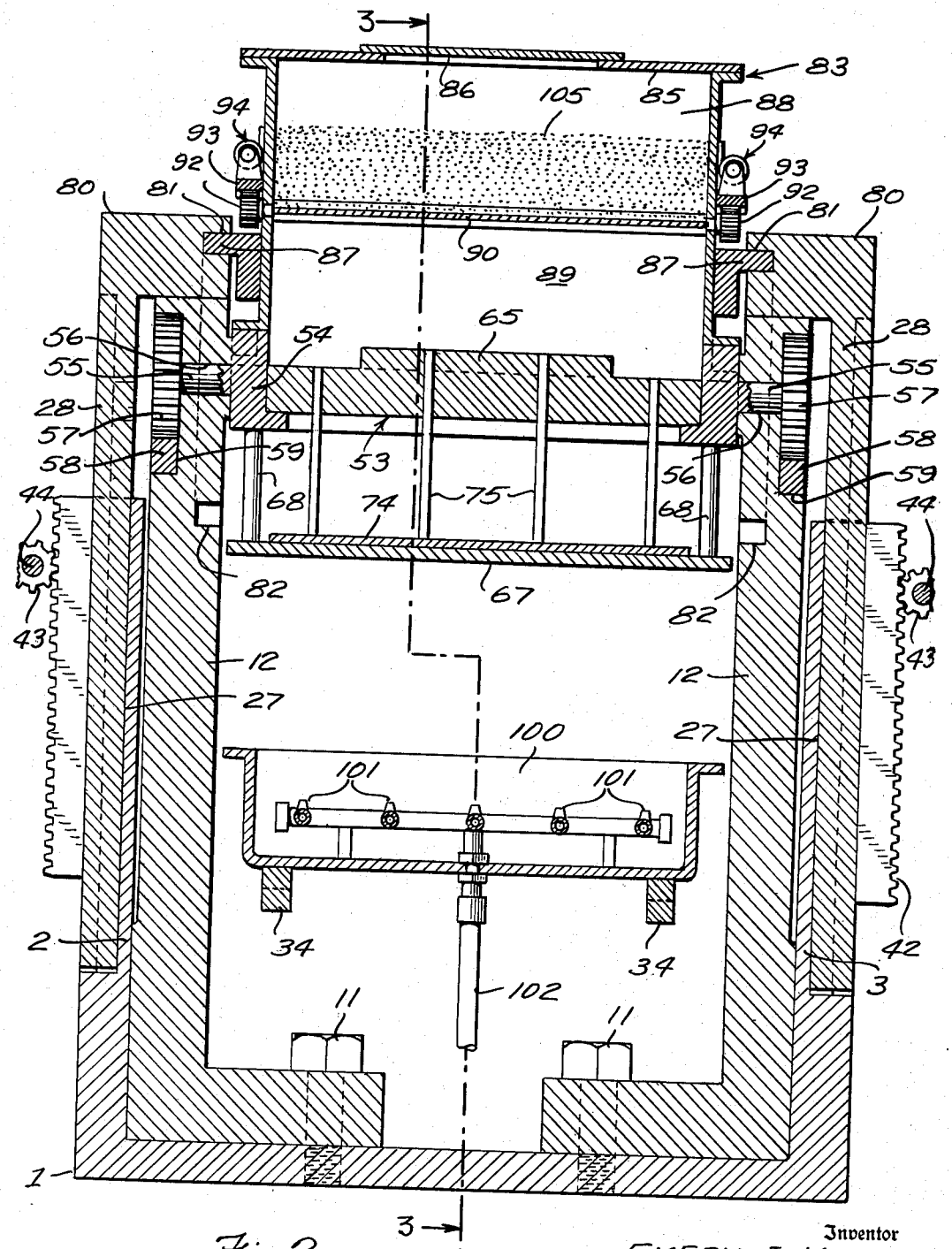
Fig. 2 is a transverse vertical section taken on the line 2—2 of Fig. 1.

In operation the molding mixture 105 is placed in the upper compartment 88 of the hopper 83. The hopper is then brought down into engagement with the upper edge of the pattern holder frame 54, as shown in Figs. 1, 2 and 4, with the hopper surrounding the pattern 65 which has been preheated and treated, as will be presently described. The louvers 90 are then opened, as shown in dotted lines in Fig. 4 and in full lines in Fig. 8. Upon the opening of the louvers 90 the molding mixture falls down into the lower compartment 89 of the hopper over the preheated pattern 65. After the mixture has been in contact with the heated pattern for a predetermined length of time the louvers 90 are closed and the pattern holder and hopper are rotated in unison through 180° from the position shown in Fig. 4 to the position shown in Fig. 8. During the time the mixture is over the pattern 65 the contacting portion thereof bonds and solidifies into a partially cured shell 106 over the face of the pattern. The thickness of the shell is dependent upon the temperature of the pattern and the length of time the mixture is maintained in contact therewith. After the pattern carrier and hopper have been rotated from the position shown in Fig. 4 to the position shown in Fig. 8 the louvers 90 are again opened allowing the unbonded portion of the mixture to fall back into compartment 88, leaving the shell 106 adhering to the face of the pattern. The louvers 90 are then closed and the carrier and hopper returned to the upright position shown in Fig. 4 with the mixture 104 in the compartment 88 above the louvers 90.

As previously stated herein, in order to produce satisfactory shell molds of uniform thickness and density, it is essential that the molding mixture be evenly distributed over the heated pattern while it is in contact therewith. In order to accomplish this even distribution of the molding mixture 105 over the pattern 65 it is necessary that the molding mixture 105 be first evenly distributed in the compartment 88, of the hopper 83, over the louvers 90 preparatory to opening the louvers 90 to drop the molding mixture 105 down onto the pattern 65.

The flow or movement of the molding mixture 105 in the hopper 83 as the pattern holder 53 and hopper 83 are rotated back and forth in alternate directions between upright and inverted positions will now be described in connection with Figs. 12 to 20, inclusive, of the drawings. In Fig. 12 the molding mixture 105 is shown evenly distributed over the louvers 90 in the compartment 88 preparatory to opening the louvers to drop the mixture down onto the pattern 65 in the compartment 89 of the hopper 83. Fig. 13 shows the louvers 90 open and the molding mixture 105 evenly distributed over the pattern 65. The pattern holder 53 and hopper 83 are held in this position (Fig. 13) the predetermined time necessary for the pattern contacting mixture to bond and solidify into a partially cured shell 106 over the pattern 65, after which the louvers 90 are closed, as shown in Fig. 14, and the pattern holder and hopper are rotated clockwise through 180° from the upright position shown in Figs. 12, 13 and 14 to the inverted position shown in Figs. 16, 17 and 18. Obviously the louvers 90 may be closed as shown in Fig. 14 any time between the time they were opened to drop the molding mixture down onto the pattern 65 and the time the pattern holder and hopper are rotated from upright position to inverted position. Fig. 15 shows the distribution of the molding mixture in the compartment 88 of the hopper 83 when the pattern holder 53 and hopper 83 are midway between upright and inverted position, and Fig. 16 shows the distribution of the molding mixture 105 over the louvers 90 in the compartment 89 at the time the pattern holder and hopper first reach inverted position. As the pattern holder and hopper approach the position shown in Fig. 16 the braking mechanism 136 operates, as previously described, to gradually decelerate the rotation thereof which eliminates bumping and jarring and effects a more even distribution of the molding mixture over the louvers in the compartment 89. After the pattern holder and hopper reach Fig. 16 position the louvers 90 are opened to drop the molding mixture 105 down from the compartment 89 into the compartment 88 as shown in Fig. 17, after which the louvers are again closed as shown in Fig. 18. The pattern holder and hopper are then rotated counterclockwise through 180° from the position shown in Fig. 18 back through the positions shown in Figs. 19 and 20, to the position shown in Fig. 12. Fig. 19 shows the distribution of the molding mixture in the compartment 88 after the pattern holder and hopper have been rotated through 45° towards upright position and Fig. 20 shows the distribution of the molding mixture in the compartment 88 as the pattern holder and hopper approach upright position. As the pattern holder and hopper approach upright position the braking mechanism 136 operates to abruptly decelerate the rotation of the pattern holder and hopper. The abrupt deceleration of the pattern holder and hopper throws the excess molding mixture at the trailing end of the hopper towards the forward end thereof and thus effects an even distribution of the molding mixture over the louvers 90 in the compartment 88 when the pattern holder and hopper come to rest in upright position as shown in Fig. 12.

After the pattern holder and hopper have been returned to upright position the hopper 83 is raised up from the pattern holder 53 to the position shown in Fig. 3 after which the carriage 111 is moved forwardly along the tracks 112 by the cylinder and piston assembly 120 to bring the oven 110 into operative position under the hopper 83 and over and around the pattern carrier 53 and the pattern 65 and the partially cured mold shell 106 thereon as shown in Fig. 9. The oven 110 is left in this position for a predetermined length of time during which time the curing of the mold shell 106 is completed. After the prescribed curing time under the oven 110 the carriage 111 and the oven carried thereby are returned to their original position. The mold shell 106 is then stripped from the pattern.

The mold shell may be stripped upwardly from the pattern while the pattern is in upright position or the pattern may be inverted and the mold shell stripped downwardly therefrom. If it is desired to strip the shell upwardly, the pattern holder and pattern are maintained in upright position and the cantilever frame 26 is raised. The raising of the cantilever frame 26 first brings the drain tank 100 into engagement with the ejector plate 67 and then further movement raises the ejector plate and the stripping pins 75 which lift the mold shell from the pattern 65, after which it is removed from the machine. If it is desired to strip the mold shell downwardly from the pattern, the pattern holder is inverted and the hopper 83 is lowered until it engages and forces the ejector plate 67 downwardly which through the stripping pins 75 will strip the shell downwardly from the pattern.

After a mold shell has been stripped from the pattern the oven 110 is moved back into operative position over the pattern 65 and under the hopper 83, as shown in Fig. 9, for a sufficient time to preheat the pattern to a predetermined temperature. After preheating the carriage 111 and oven 110 are returned to their original position and the pattern holder and pattern inverted. The drain tank 100 is then raised into engagement with the pattern holder around the pattern, as shown in Fig. 3. The parting solution is then sprayed over the face of the pattern from the nozzles 101. After spraying the drain tank 100 is lowered to its original position and the pattern holder and pattern returned to upright position. Everything is now in readiness for the cycle of operation to be repeated in forming the next mold shell.

While the mechanism for effecting the even distribution of molding mixture over a pattern has been shown and described herein in connection with a fully automatic machine, it will be obvious that it can be applied equally well to semi-automatic machines wherein the hopper is permanently mounted for rotation between upright and inverted positions by a fluid-actuated reciprocal piston and the pattern holder with a preheated pattern mounted thereon is manually secured to and removed from the open end of the hopper when the hopper is at rest in inverted position. In these semi-automatic machines the louvers which divide the hopper into upper and lower compartments are dispensed with and the molding mixture is distributed directly over the pattern as the hopper is brought to upright position. In operation the molding mixture is placed in the hopper while the hopper is at rest in inverted position with the open end thereof uppermost. The pattern holder with a preheated pattern mounted thereon is then manually secured to the open end of the hopper with the pattern facing downwardly into the hopper. The hopper is then rotated to upright position to distribute the molding mixture over the face of the pattern and is maintained stationary in upright position until the molding mixture bonds and solidifies to the desired thickness after which the hopper is returned to inverted position, in which position the unbonded excess molding fixture falls down into the hopper leaving the formed mold shell adhering to the pattern. The pattern holder and pattern with the partially cured mold shell thereon are then manually removed from the hopper and placed in a suitable oven for a sufficient time to complete the curing of the mold shell after which the finished mold shell is stripped from the pattern.

From the foregoing it will be apparent to those skilled in this art that I provide a very simple and efficient apparatus for accomplishing the objects of the invention.

It is to be understood that I am not limited to the specific construction shown and described herein as various modifications may be made therein within the spirit of the invention. For example the specific actuating means, shown as pinions and piston-operated racks, may be replaced by other mechanism adapted to operate in a similar manner. Also the drain tank 100 and spray nozzles 101 which are provided to apply the parting solution to the pattern may be eliminated, and other means, either manual or automatic, provided for spraying the parting solution upon the pattern when it is in either upright or inverted position. Also any other suitable gate means, either rotary or slidable, may be substituted for the louvers 90 in the hopper 83.

What is claimed is:

1. In an apparatus of the character described, a pattern, a hopper for a molding mixture having a discharge opening at one end, closure means in said hopper above said discharge opening forming a closed hopper compartment, means operative to cause relative movement between said pattern and said hopper to bring said hopper and said pattern into engagement with the open end of the hopper surrounding said pattern, means opening said closure means with said hopper in upright position above said pattern to supply molding mixture from said hopper to said pattern by gravity, means operative to rotate said pattern and said hopper in unison to inverted position while maintaining said hopper in contact with said pattern for returning excess molding mixture by gravity to said hopper, means closing said closure means to confine said mixture to said hopper compartment, means rotating said pattern and hopper in unison to upright position, and means to decelerate the rotation of said hopper abruptly as it approaches one of its limit positions so as to cause the molding mixture to flow and to redistribute itself in said compartment to a substantially uniform depth.

2. In an apparatus of the character described, a pattern, a hopper for a molding mixture having a discharge opening at one end, closure means in said hopper above said discharge opening forming a closed hopper compartment, means operative to cause relative movement between said pattern and said hopper to bring said hopper and said pattern into engagement with the open end of the hopper surrounding said pattern, means opening said closure means with said hopper in upright position above said pattern to supply molding mixture from said hopper to said pattern by gravity, means operative to rotate said pattern and said hopper in unison to inverted position while maintaining said hopper in contact with said pattern for returning excess molding mixture by gravity to said hopper, means closing said closure means to confine said mixture to said hopper compartment, means rotating said pattern and hopper in unison to upright position, and means to decelerate the rotation of said hopper abruptly as it approaches upright position so as to cause the molding mixture to flow and to redistribute itself in said compartment to a substantially uniform depth.

3. In an apparatus of the character described, a pattern, a hopper for a molding mixture having a discharge opening at one end, closure means in said hopper above said discharge opening forming a closed hopper compartment, means operative to cause relative movement between said pattern and said hopper to bring said hopper and said pattern into engagement with the open end of the hopper surrounding said pattern, means opening said closure means with said hopper in upright position above said pattern to supply molding mixture from said hopper to said pattern by gravity, means operative to rotate said pattern and said hopper in unison to inverted position while maintaining said hopper in contact with said pattern for returning excess molding mixture by gravity to said hopper, means to decelerate the rotation of said hopper abruptly as it approaches vertical inverted position so as to cause the molding mixture to flow and to redistribute itself in said compartment to a substantially uniform depth, means closing said closure means to confine said mixture to said hopper compartment, and means rotating said pattern and hopper in unison to upright position.

4. In an apparatus of the character described, a pattern, a hopper for a molding mixture having a discharge opening at one end, closure means in said hopper above said discharge opening forming a closed hopper compartment, means operative to cause relative movement between said pattern and said hopper to bring said hopper and said pattern into engagement with the open end of the hopper surrounding said pattern, means opening said closure means with said hopper in upright position above said pattern to supply molding mixture from said hopper to said pattern by gravity, means operative to rotate said pattern and said hopper in unison to inverted position while maintaining said hopper in contact with said pattern for returning excess molding mixture by gravity to said hopper, means to decelerate the rotation of said hopper abruptly as it approaches vertical inverted position so as to cause the molding mixture to flow and to redistribute itself in said compartment to a substantially uniform depth, means closing said closure means to confine said mixture to said hopper compartment, means rotating said pattern and hopper in unison to upright position, and means to decelerate the rotation of said hopper abruptly as it approaches upright position so as to cause the molding mixture to flow and to redistribute itself in said compartment to a substantially uniform depth.

5. In an apparatus of the character described, a rotatably mounted pattern holder adapted to receive a pattern, a hopper open at the lower end thereof mounted above said holder, means operative to bring said hopper and holder into engagement with each other with the lower end of said hopper surrounding said pattern, means operative to rotate said holder and said hopper in unison between upright and inverted positions when said hopper is in engagement with said holder, an oven, means operative to bring said oven and said pattern holder into juxtaposition for heating a mold shell on a pattern carried by said pattern holder when said hopper is out of engagement with said holder and braking mechanism operative to abruptly decelerate the movement of said holder and said hopper as they approach the limit of their movement to upright position, said rotating means comprising a fluid actuated reciprocal piston and operative connections between said piston and said holder and hopper, said braking mechanism comprising a stationary cylinder, a braking piston reciprocally mounted in said cylinder, a piston rod by which said braking piston is connected to said fluid actuated piston for reciprocation therewith, a conduit through which hydraulic fluid is drawn into said cylinder as said braking piston is moved in one direction and through which conduit hydraulic fluid is discharged from said cylinder as said braking piston is moved in the opposite direction, a valve in said conduit which is operative when actuated to abruptly check the discharge of hydraulic fluid from said cylinder, and a cam carried by said piston rod in position to actuate said valve at a predetermined position of said braking piston.

6. In an apparatus of the character described, a stationary frame, a curing oven spaced from said frame, a pattern holder rotatably mounted in said frame and adapted to receive a pattern, a carriage mounted for vertical movement on said frame, a hopper for a molding mixture supported by said carriage above said holder, gate means in said hopper to divide said hopper into upper and lower compartments, a frame mounted for vertical movement in said stationary frame, pattern spraying mechanism including a drain tank mounted on said last frame below said holder, means to raise and lower said carriage to move said hopper into and out of engagement with said holder, means actuating said gate means for transferring said molding mixture from said hopper to said holder, means to rotate said holder and said hopper in unison between upright and inverted positions while said hopper is maintained in engagement with said holder, means to raise and lower said last frame to move said drain tank into and out of engagement with said holder, means bringing said curing oven and said hopper into and out of cooperative relationship with each other, and braking mechanism operative to abruptly decelerate the movement of said holder and said hopper as they approach the limit of their movement to upright position, said rotating means comprising a fluid actuated reciprocal piston and operative connections between said piston and said holder and hopper, said braking mechanism comprising a stationary cylinder, a braking piston reciprocally mounted in said cylinder, a piston rod by which said braking piston is connected to said fluid actuated piston for reciprocation therewith, a conduit through which hydraulic fluid is drawn into said cylinder as said braking piston is moved in one direction and through which conduit hydraulic fluid is discharged from said cylinder as said braking piston is moved in the opposite direction, a valve in said conduit which is operative when actuated to abruptly check the discharge of hydraulic fluid from said cylinder, and a cam carried by said piston rod in position to actuate said valve at a predetermined position of said braking piston.

7. In an apparatus of the character described, a rotatably mounted pattern holder adapted to receive a pattern, a hopper open at the lower end thereof mounted above said holder, means operative to bring said hopper and holder into engagement with each other with the lower end of said hopper surrounding said pattern, means operative to rotate said holder and said hopper in unison between upright and inverted positions when said hopper is in engagement with said holder, an oven, means operative to bring said oven and said pattern holder into juxtaposition for heating a mold shell on a pattern carried by said pattern holder when said hopper is out of engagement with said holder and braking mechanism operative to abruptly decelerate the movement of said holder and said hopper as they approach the limit of their movement to upright position, said rotating means comprising a fluid actuated reciprocal piston and operative connections between said reciprocal piston and said holder and hopper, said braking mechanism comprising a stationary cylinder, a braking piston reciprocally mounted in said cylinder, a piston rod by which said braking piston is connected to said fluid actuated piston for reciprocation therewith, a first conduit through which hydraulic fluid is drawn into and discharged from said cylinder on one side of said braking piston, a second conduit through which hydraulic fluid is drawn into and discharged from said cylinder on the opposite side of said braking piston, a valve in said first conduit which is operative when actuated to abruptly check the discharge of hydraulic fluid from said cylinder, a valve in said second conduit which is operative when actuated to gradually check the discharge of hydraulic fluid from said cylinder, a cam carried by said piston rod in position to actuate said valve in said first conduit at a predetermined position of said braking piston when moving in one direction, and a second cam carried by said piston rod in position to actuate said valve in said second conduit at a predetermined position of said braking piston when moving in the opposite direction.

8. In an apparatus of the character described, a stationary frame, a curing oven spaced from said frame, a pattern holder rotatably mounted on said frame and adapted to receive a pattern, a carriage mounted for vertical movement on said frame, a hopper for a molding mixture supported by said carriage above said holder, gate means in said hopper to divide said hopper into upper and lower compartments, a frame mounted for vertical movement in said stationary frame, pattern spraying mechanism including a drain tank mounted on said last frame below said holder, means to raise and lower said carriage to move said hopper into and out of engagement with said holder, means actuating said gate means for transferring said molding mixture from said hopper to said holder, means to rotate said holder and said hopper in unison between upright and inverted positions while said hopper is maintained in engagement with said holder, means to raise and lower said last frame to move said drain tank into and out of engagement with said holder, means bringing said curing oven and said hopper into and out of cooperative relationship with each other, and braking mechanism operative to abruptly decelerate the movement of said holder and said hopper as they approach the limit of their movement to upright position, said rotating means comprising a fluid actuated reciprocal piston and operative connections between said reciprocal piston and said holder and hopper, said braking mechanism comprising a stationary cylinder, a braking piston reciprocally mounted in said cylinder, a piston rod by which said braking piston is connected to said fluid actuated piston for reciprocation therewith, a first conduit through which hydraulic fluid is drawn into and discharged from said cylinder on one side of said braking piston, a second conduit through which hydraulic fluid is drawn into and discharged from said cylinder on the opposite side of said braking piston, a valve in said first conduit which is operative when actuated to abruptly check the discharge of hydraulic fluid from said cylinder, a valve in said second conduit which is operative when actuated to gradually check the discharge of hydraulic fluid from said cylinder, a cam carried by said piston rod in position to actuate said valve in said first conduit at a predetermined position of said braking piston when moving in one direction, and a second cam carried by said piston rod in position to actuate said valve in said second conduit at a predetermined position of said braking piston when moving in the opposite direction.

9. A machine for forming shell molds comprising a pattern holder adapted to have a pattern mounted thereon, a hopper which is open at one end thereof and is adapted to contain a predetermined, maximum amount of molding mixture, means by which said holder and said hopper are detachably secured together with the open end of said hopper surrounding a pattern mounted on said pattern holder, shaft means by which said holder and hopper are supported for rotation about a horizontal axis, a fluid actuated reciprocal piston, operative connections between said shaft means and said reciprocal piston through which said shaft means is rocked back and forth through approximately 180° to rotate said holder and hopper between upright and inverted positions and braking mechanism by which the rotation of said holder and hopper is abruptly decelerated as they approach the limit of their movement to upright position to effect the uniform distribution of the molding mixture in said hopper over a pattern mounted on said pattern holder when said holder and hopper are at rest in upright position, said braking mechanism comprising a stationary cylinder, a braking piston reciprocally mounted in said cylinder, a piston rod by which said braking piston is connected to said fluid actuated piston for reciprocation therewith, a conduit through which hydraulic fluid is drawn into said cylinder as said braking piston is moved in one direction and through which conduit hydraulic fluid is discharged from said cylinder as said braking piston is moved in the opposite direction, a valve in said conduit which is operative when actuated to abruptly check the discharge of hydraulic fluid from said cylinder, and a cam carried by said piston rod in position to actuate said valve at a predetermined position of said braking piston.

10. A machine for forming shell molds comprising a pattern holder adapted to have a pattern mounted thereon, a hopper which is open at one end thereof and is adapted to contain a predetermined, maximum amount of molding mixture, means by which said holder and said hopper are detachably secured together with the open end of said hopper surrounding a pattern mounted on said pattern holder, shaft means by which said holder and hopper are supported for rotation about a horizontal axis, a fluid actuated reciprocal piston, operative connections between said shaft means and said reciprocal piston through which said shaft means is rocked back and forth through approximately 180° to rotate said holder and hopper between upright and inverted positions and braking mechanism by which the rotation of said holder and hopper is abruptly decelerated as they approach the limit of their movement to upright position to effect the uniform distribution of the molding mixture in said hopper over a pattern mounted on said pattern holder when said holder and hopper are at rest in upright position, said braking mechanism comprising a stationary cylinder, a braking piston reciprocally mounted in said cylinder, a piston rod by which said braking piston is connected to said fluid actuated piston for reciprocation therewith, a first conduit through which hydraulic fluid is drawn into and discharged from said cylinder on one side of said braking piston, a second conduit through which hydraulic fluid is drawn into and discharged from said cylinder on the opposite side of said braking piston, a valve in said first conduit which is operative when actuated to abruptly check the discharge of hydraulic fluid from said cylinder, a valve in said second conduit which is operative when actuated to gradually check the discharge of hydraulic fluid from said cylinder, a cam carried by said piston rod in position to actuate said valve in said first conduit at a predetermined position of said braking piston when moving in one direction, and a second cam carried by said piston rod in position to actuate said valve in said second conduit at a predetermined position of said braking piston when moving in the opposite direction.

References Cited in the file of this patent

UNITED STATES PATENTS

| | | |
|---|---|---|
| 866,607 | Weimer | Sept. 17, 1907 |
| 2,483,808 | Carpenter | Oct. 4, 1949 |
| 2,485,336 | Valyi | Oct. 18, 1949 |

OTHER REFERENCES

The Iron Age, April 19, 1952, pages 81–85.